United States Patent [19]

Cardinal

[11] Patent Number: 5,377,538
[45] Date of Patent: Jan. 3, 1995

[54] METHOD AND APPARATUS FOR MEASURING THE VOLUME AND THE VELOCITY OF AIR FLOWING THROUGH INDIVIDUAL PARTS OF A TWO CYCLE ENGINE CYLINDER

[76] Inventor: Richard L. Cardinal, 115 Beach, Hereford, Tex. 79056

[21] Appl. No.: 828,761

[22] Filed: Jan. 30, 1992

[51] Int. Cl.⁶ .............................................. G01P 5/16
[52] U.S. Cl. ..................................... 73/118.2; 73/49.7; 73/119 R
[58] Field of Search .................. 73/49.7, 861.42, 118.2, 73/118.1, 119 R, 116, 37, 861.52, 861.65

[56] References Cited

U.S. PATENT DOCUMENTS

| | | | |
|---|---|---|---|
| 2,494,936 | 1/1950 | Edelen | 73/49.7 |
| 2,671,345 | 3/1954 | Rubin | 73/49.7 |
| 2,697,940 | 12/1954 | Crosby et al. | 73/49.7 |
| 4,041,777 | 8/1977 | Leunig et al. | 73/118.1 |
| 5,072,613 | 12/1991 | Baer et al. | 73/119 R |

OTHER PUBLICATIONS

Caswell, "Moto-Joe", Tools and Equipment, Motorcycle Industry Magazine, May 1991, pp. 38, 39.
Pro Flow II advertising brochure, no date.
Super Flow 110 advertising brochure, no date.
Pro Flow Model 115 advertising copy, no date.

*Primary Examiner*—Robert Raevis
*Assistant Examiner*—James M. Olsen

[57] ABSTRACT

A method of measuring the volume and the velocity of fluid flow through individual ports or combination of ports of a ported cylinder as defined by the cut away of an isolation tube, and utilizing a pitot tube coupled with a pressure differential gage to measure flow velocity while imposing fluid pressure at a predetermined pressure, and at a predetermined inlet opening and a measuring device for comparing inlet pressures to determine differences in flow volume, and an apparatus for carrying out the method.

4 Claims, 3 Drawing Sheets

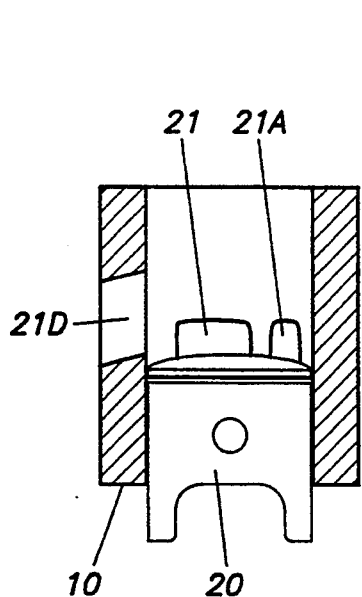
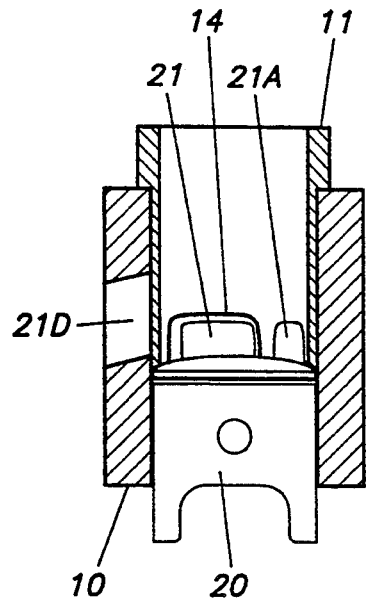
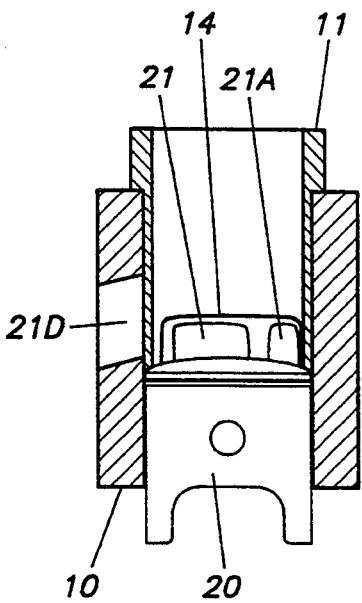
Fig.2   Fig.4   Fig.6
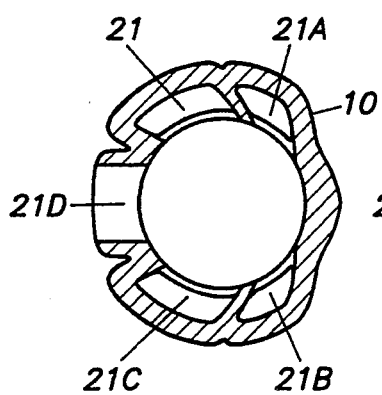
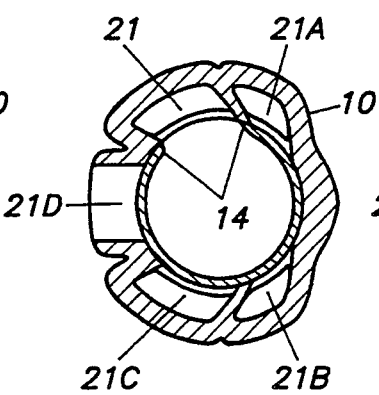
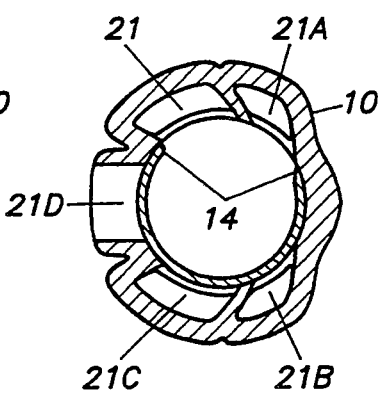
Fig.3   Fig.5   Fig.7

METHOD AND APPARATUS FOR MEASURING THE VOLUME AND THE VELOCITY OF AIR FLOWING THROUGH INDIVIDUAL PARTS OF A TWO CYCLE ENGINE CYLINDER

BACKGROUND AND SUMMARY OF THE INVENTION

The present invention relates to a measuring device which which will accurately measure the volume as well as the velocity of fluid flow through a single port or combination of ports of a ported cylinder; and a method for analyzing the design and or modifications of the ports.

In designing or modifying port configuration it is desirable to know the volume and the velocity of fluid flow into the cylinder while the ports are open and the cylinder is being filled. More importantly it is desirable to know the volume and velocity through each individual port or combination of ports in order to know which ports to modify in an effort to improve fluid flow in order to improve performance and power output.

Therefore it is desirous to have technique and equipment which enable a determination of flow volume and velocity through individual port or combination of ports of a particular cylinder. Also the technique should provide information useful in the design and, or modification of port configuration and, or port finish to optimize fluid flow into a particular cylinder. Accordingly, it is an object of the present invention to provide the art with such apparatus and technique or procedure.

The present invention provides the art with apparatus and procedure which enables measuring fluid flow through an individual port or or combination of ports of a ported cylinder; a means for generating fluid flow through such cylinder port or combination of ports; an isolation device for directing fluid flow through a selected port or combination of ports; and a means of measuring both the volume and the velocity of the fluid flow through the isolated port or combination of ports.

From the following detailed description taken in conjunction with the accompanying drawings and claims, other objects and advantages will become apparent to those skilled in the art.

SUMMARY OF THE PRIOR ART (a) Prior art cited utilizes oil filled tube type gages, this invention utilizes analog pressure differential gages, which are more easily read, and which require much less maintenance and calibration.

(b) Prior art utilizes holes and stoppers to control air intake, making it difficult or impossible to make the small changes necessary when working with small individual ports of two cycle cylinders. This invention utilizes an infinitely adjustable inlet valve.

(c) Prior art shows no apparatus for measuring flow through an individual port or defined group of ports of a multi-ported cylinder. This invention utilizes an isolation tube, the cut-away of which defines the individual port or group of ports to be measured.

(d) Prior art shows no apparatus for measuring the velocity of fluid flow through an individual port of a multi-ported cylinder. This invention utilizes a pitot tube coupled to an analog pressure differential gage in conjunction with a port isolation tube to accomplish this.

BRIEF DESCRIPTION OF THE DRAWINGS

FIG. 2 illustrates a partially cross-sectioned side view of the cylinder (10) with piston (20) installed and cylinder port exits (21), (21A) and (21D) shown.

FIG. 3 illustrates a cross-sectioned top view of the cylinder (10), in FIG. 2, illustrating various ports, and port exits (21) through (21D).

FIG. 4 illustrates a partially cross-sectioned side view of the cylinder (10) with piston (20) installed and isolation tube (11) positioned inside the bore of the cylinder. Also illustrated is a cut-away (14) in the isolation tube which exposes the main transfer port (21) while blocking the auxiliary port (21A), and port (21D).

FIG. 5 illustrates a cross-sectioned top view of the cylinder (10), in FIG. 4, with isolation tube (11) installed, and cut-away (14) exposing port exit (21), and blocking other ports (21A) through (21D).

FIG. 6 illustrates a partially cross-sectioned side view of the cylinder (10) with piston (20) installed and isolation tube (11) positioned inside the bore of the cylinder. In this illustration the configuration of the cut-away (14) has been changed or enlarged to expose both port exits (21) and (21A).

FIG. 7 illustrates a cross-sectioned top view of the cylinder (10), in FIG. 6, with isolation tube (11) installed, and cut-away (14) exposing port exits (21) and (21A), and blocking other ports (21B) through (21D).

DETAILED DESCRIPTION OF THE PREFERRED EMBODIMENT

Figure 1:
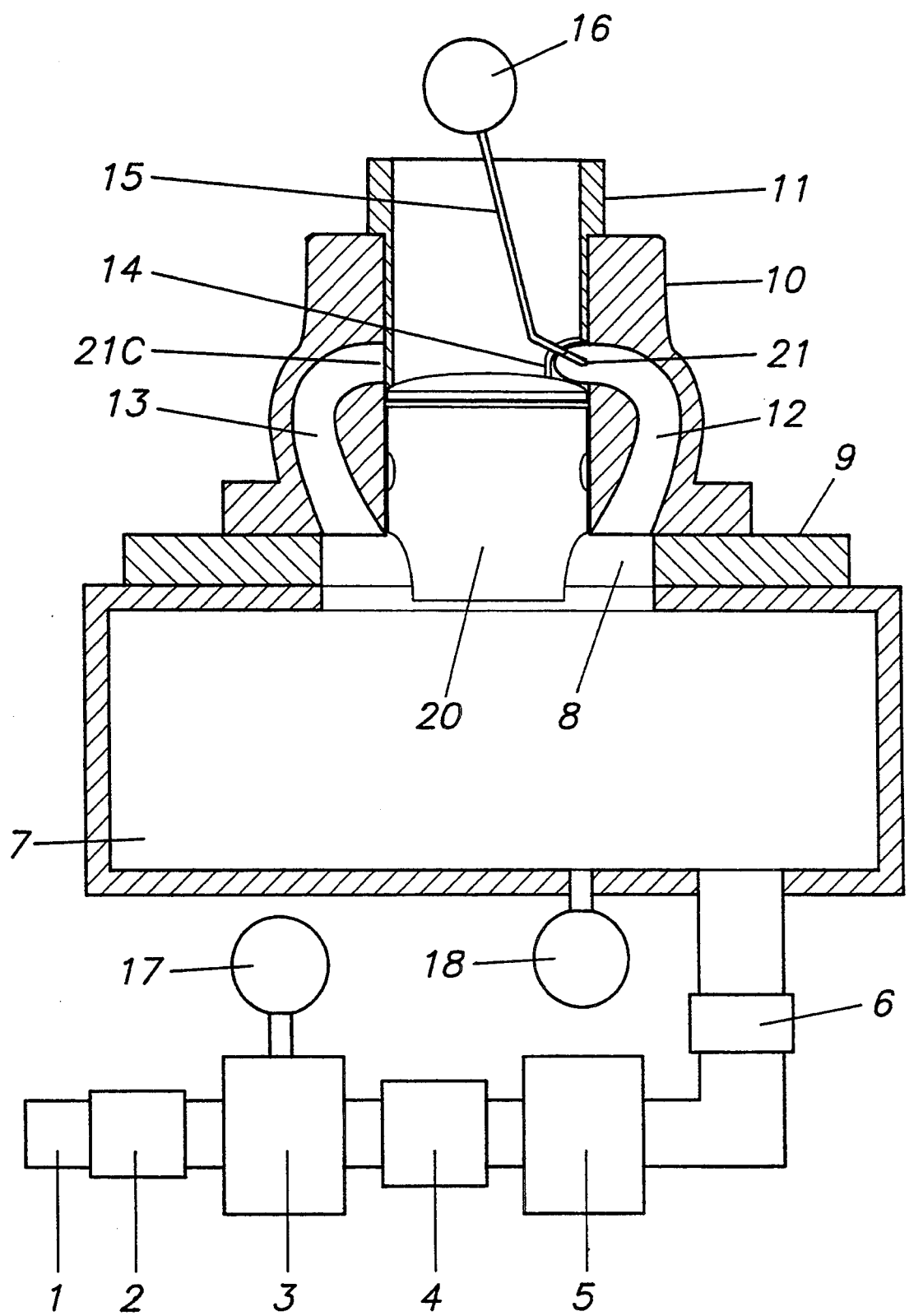
FIG. 1 is a partially cross-sectioned aide view of apparatus of the present invention necessary to practice the method of the present invention.
Figure 8:
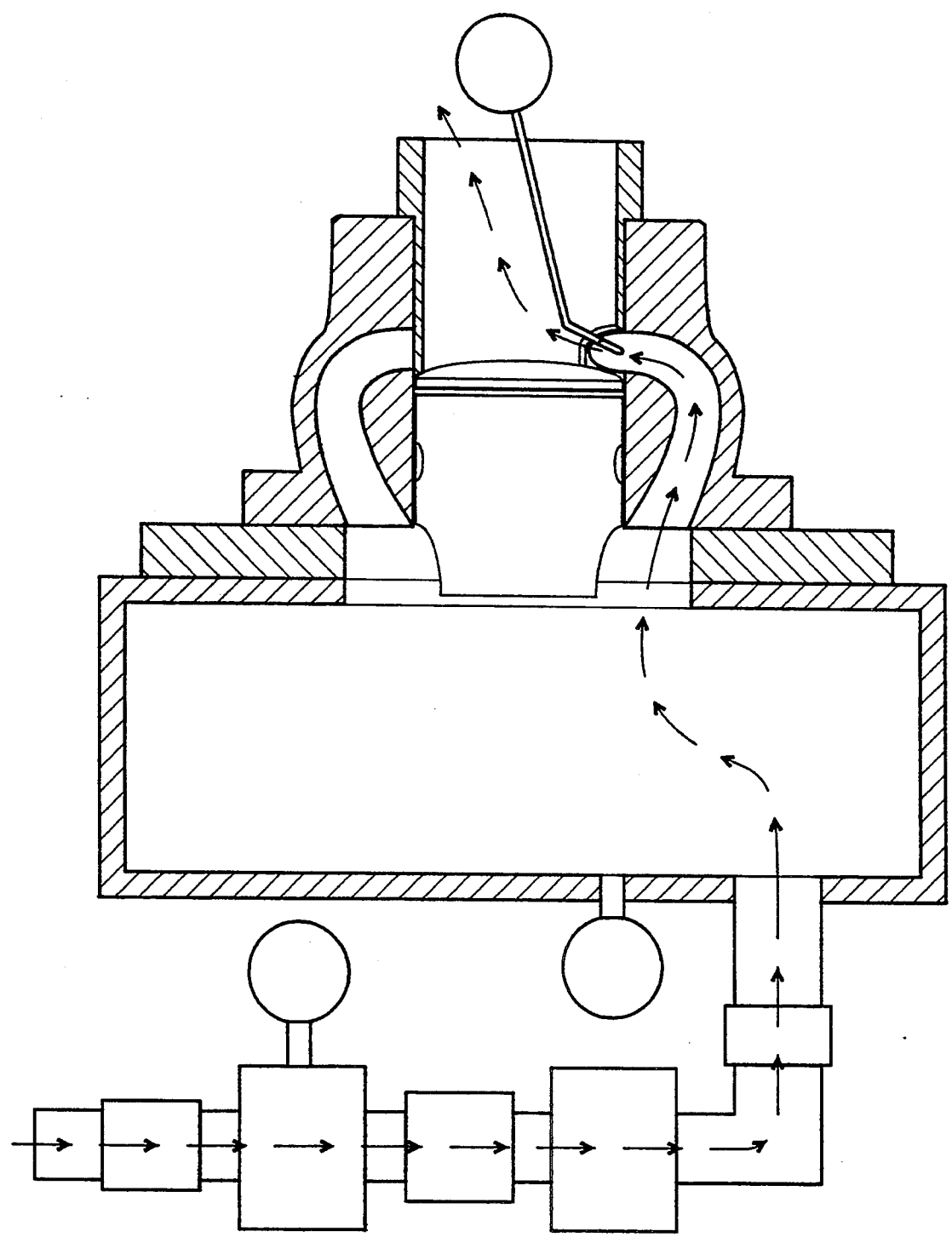
FIG. 8 illustrates the path of fluid flow through the device illustrated in FIG. 1. Arrows indicate the direction and path of flow.

Turning to the Figures, particularly FIG. 1, equipment to generate and measure fluid flow is generally comprised of a multi-chambered device comprising: a low pressure chamber (3), a high pressure chamber (5) and a test pressure chamber (7); a vacuum motor (4) positioned between the low pressure chamber (3) and the high pressure chamber (5); a flow control valve (2) positioned at the inlet side (1) of the low pressure chamber (3); and a flow control valve (6) positioned between the high pressure chamber (5) and the test pressure chamber (7). The low pressure chamber (3) is connected to the low pressure port of a pressure differential gage (17). The test pressure chamber is connected to the high pressure port of a second pressure differential gage (18). The test pressure chamber (7), contains a large orifice (8) in the upper member of the chamber (7). A cylinder adapter (9) is attached to the outer surface of the upper member of of the test pressure chamber (7). The test cylinder (10) with piston and rings (20) installed is attached to the adapter plate (9) with the piston positioned at bottom dead center. A port isolation tube (11) with cut-away (14) is positioned in the bore of the cylinder (10) with the cut-away (14) exposing the port or group ports (21) to be tested.

A pitot tube (15) is positioned with pitot inlet positioned in the isolated port (21) at the point where fluid flow exits port into the cylinder. The two ports of the pitot tube (15) are connected to the ports of a third pressure differential gage (16).

In addition to ports (12) and (13) in FIG. 1, the cylinder (10) may contain additional transfer or intake ports (21A), (21B), (21C) and one or more exhaust ports (21D) in FIG. 2 through FIG. 7.

Since subject shown in FIG. 1 relates to the method of measuring inlet fluid flow, the exhaust port is not shown. During practice, the exhaust will remain open or closed as defined by the cut-away (14) of the isolation tube (11). Obviously fluid flow volume through all ports may be measured by having the cut-away (14) of the isolation tube (11) define all ports of the cylinder (10); in effect this is accomplished if the isolation tube (14) is removed from the cylinder (10). In this situation, the velocity may be measured at each individual port by positioning the pitot tube (15) in to the port exit of the port to be measured. Pitot tube (16) may be inserted from the top of the cylinder, as shown in FIG. 1, or if a cylinder head is installed the pitot tube may be inserted through the exhaust port and positioned in the desired port exit.

The isolation tube (11) is a hollow cylindrical tube with an outside diameter equal to the bore diameter of the test cylinder (10), the length of which is long enough to allow the the bottom of the tube to rest on the top edge of the piston (20) when the piston is located at bottom dead center in the bore of the test cylinder (10), and tube having a cut-away, or relieved portion (14) at the lower edge which corresponds to the shape of the port opening (21) of the port or combination of ports which are to be tested.

In use, the vacuum motor (4) is energized, causing a fluid such as air to flow through the inlet (1) of the inlet flow control valve (2), which is set to a pre determined position; into a low pressure chamber (3), which is connected to the low pressure port of a pressure differential gage (17). Fluid passes through vacuum motor (4) into a high pressure chamber (5), through a test pressure control valve (6) which is set at a pre determined position, into a teat pressure chamber (7), which is connected to the high pressure port of pressure differential gage (18). Fluid then flows through the large orifice (8) in the upper member of chamber (7).

Cylinder to be tested (10) is attached to adaptor plate (9), and plate (9) is positioned over orifice (8) in upper member of chamber (7). the cylinder (10) is attached to plate (9) and Plate (9) to chamber (7) in such a manner as to produce an air tight seal between the joining surfaces.

Fluid passes from chamber (7), through orifice (8), through the opening in adaptor plate (9), through port (12) of cylinder (10), and out through the port opening (21) as defined by the cut-away (14) of the isolation tube (11), and out of the cylinder. Fluid flow through port (13) is blocked by the wall of the isolation tube (11).

A pitot tube (15), positioned in the port outlet (21) senses the velocity of the fluid flow from the port exit (21), and is connected to a pressure differential gage (16), which indicates the velocity of the fluid flow.

In practice it is desirable to have a means of indicating the exact position of the inlet flow valve (2). While this is a convenience, it is not critical to this invention or method, therefore it is not shown in the illustrations.

In summary, if test are performed and compared before and after port modification and if same port or combination of ports, are tested or compared with the inlet flow control valve (2) set at the same position, and at the same test pressure any changes in flow volume will be indicated by the difference in the before and after indications of pressure differential gage (17), and any changes in flow velocity will be reflected in the before and after indications of gage (16).

While the above describes a preferred embodiment of the present invention, it will be understood that modifications, variations, and alterations may be made to the present invention without deviation from the scope and fair meaning of the subjoined claims.

What is claimed

1. A method of measuring air flow through a port or group of ports of a two cycle cylinder for the purpose of comparing to a similar port or group of ports of the same or similar cylinder comprising: drawing air through a variable intake valve linked to a calibrated indicator scale, set at a predetermined position, into a low pressure chamber connected to a pressure differential gage, through a vacuum motor into a high pressure chamber, through a variable valve, into a test pressure chamber at a predetermined pressure into the transfer ports of a test cylinder with piston and rings fitted and positioned at bottom dead center, through the port or group of ports exposed by a cut away in a port isolation tube fitted inside the cylinder bore, past a pitot tube connected to a pressure differential gage positioned at the port exit; and comparing low pressure signal generated and pitot tube signal generated as a means of evaluating port configurations, modifications and finishes of similar ports or group of ports of the same or similar cylinders.

2. The method according to claim 1 further comprising fitting isolation tubes with various cut aways inside the bore of the test cylinder as a means of limiting air flow through an individual port or group of ports of said cylinder; comparing air volume and air velocity; evaluating modifications of ports of same or similar cylinders.

3. The method according to claim 1 comprising passing air at a predetermined volume through a port or group of ports as defined by a cut away of said isolation tube, at a pre determined pressure, past a pitot positioned at the port outlet; utilizing indicated readings of said low pressure chamber gage and of said pressure differential gage attached to a pitot tube as a means of comparing or evaluating successive port modifications.

4. Apparatus for measuring fluid flow through an individual port or combination of ports of a ported cylinder comprising: means for producing fluid flow through said cylinder port or combination of ports; an isolation tube for isolating said flow to a selected port or combination of ports; and a means for measuring said isolated flow.

* * * * *